United States Patent
Danziger et al.

(10) Patent No.: US 11,927,734 B2
(45) Date of Patent: *Mar. 12, 2024

(54) LIGHT-GUIDE DEVICE WITH OPTICAL CUTOFF EDGE AND CORRESPONDING PRODUCTION METHODS

(71) Applicant: LUMUS LTD., Ness Ziona (IL)

(72) Inventors: Yochay Danziger, Kfar Vradim (IL); Edgar Friedmann, Sdey-Avraham (IL)

(73) Assignee: Lumus Ltd., Ness Ziona (IL)

( * ) Notice: Subject to any disclaimer, the term of this patent is extended or adjusted under 35 U.S.C. 154(b) by 21 days.

This patent is subject to a terminal disclaimer.

(21) Appl. No.: 17/857,253

(22) Filed: Jul. 5, 2022

(65) Prior Publication Data
US 2022/0334366 A1    Oct. 20, 2022

Related U.S. Application Data

(63) Continuation of application No. 16/595,506, filed on Oct. 8, 2019, now Pat. No. 11,378,791, which is a
(Continued)

(51) Int. Cl.
*G02B 17/08*    (2006.01)
*B29D 11/00*    (2006.01)
(Continued)

(52) U.S. Cl.
CPC ...... *G02B 17/086* (2013.01); *B29D 11/00663* (2013.01); *B29D 11/00875* (2013.01);
(Continued)

(58) Field of Classification Search
CPC .......... G02B 17/086; G02B 1/10; G02B 6/34; G02B 17/00; G02B 6/30; G02B 6/262; B29D 11/00663; B29D 11/00875
See application file for complete search history.

(56) References Cited

U.S. PATENT DOCUMENTS

| | | |
|---|---|---|
| 3,969,023 A | 7/1976 | Brandt et al. |
| 4,932,743 A | 6/1990 | Isobe et al. |

(Continued)

FOREIGN PATENT DOCUMENTS

| | | |
|---|---|---|
| CN | 106054292 | 10/2016 |
| CN | 207216158 U | 4/2018 |

(Continued)

OTHER PUBLICATIONS

Salter, P. S. and Booth, M. J. et al. "Designing and aligning optical systems incorporating Liquid crystal spatial light modulators (SLMs)", Department of Engineering, University of Oxford, vr1.0, doi: 10.5281/zenodo.4518992 (published online Feb. 12, 2020) Salter, P. S. and Booth, M. J. Feb. 12, 2020 (Feb. 12, 2020).
(Continued)

*Primary Examiner* — Collin X Beatty
(74) *Attorney, Agent, or Firm* — Rivka Friedman

(57) ABSTRACT

A light-guide device includes a light guiding element (13) with a number of faces, including two parallel faces (26), for guiding light by internal reflection. A transparent optical element (19) has an interface surface for attachment to a coupling surface (14) of the light guiding element, and is configured such that light propagating within the transparent optical element passes through the interface surface and the coupling surface (14) so as to propagate within the light guiding element (13). A non-transparent coating (15) is applied to at least part of one or more faces of the light guiding element (13), defining an edge (17) adjacent to, or overlapping, the coupling surface (14) of the light guiding element (13). A quantity of transparent adhesive is deployed between the coupling surface and the interface surface so as to form an optically transmissive interface. An overspill region 31 of the adhesive extends to, and overlaps, the edge (17).

17 Claims, 11 Drawing Sheets

Related U.S. Application Data continuation of application No. 15/996,476, filed on Jun. 3, 2018, now Pat. No. 10,437,031, which is a continuation of application No. PCT/IL2017/051217, filed on Nov. 8, 2017, which is a continuation-in-part of application No. PCT/IL2017/051028, filed on Sep. 12, 2017.

(60) Provisional application No. 62/535,890, filed on Jul. 23, 2017, provisional application No. 62/509,369, filed on May 22, 2017, provisional application No. 62/418,919, filed on Nov. 8, 2016.

(51) Int. Cl.
    *G02B 1/10*     (2015.01)
    *G02B 6/30*     (2006.01)
    *G02B 6/34*     (2006.01)
    *G02B 17/00*     (2006.01)

(52) U.S. Cl.
    CPC ............. *G02B 1/10* (2013.01); *G02B 6/34* (2013.01); *G02B 17/00* (2013.01); *G02B 6/30* (2013.01)

(56) References Cited

U.S. PATENT DOCUMENTS

| | | | |
|---|---|---|---|
| 5,208,800 | A | 5/1993 | Isobe et al. |
| 5,235,589 | A | 8/1993 | Yokomori et al. |
| 6,021,239 | A | 2/2000 | Minami et al. |
| 6,185,015 | B1 | 2/2001 | Silviu et al. |
| 6,222,677 | B1 | 4/2001 | Budd et al. |
| 6,239,771 | B1 | 5/2001 | Usuki et al. |
| 6,847,488 | B2 | 1/2005 | Travis |
| 6,879,443 | B2 | 4/2005 | Spitzer et al. |
| 7,457,040 | B2 * | 11/2008 | Amitai .......... G02B 30/26 359/857 |
| 7,576,932 | B2 * | 8/2009 | Vandorpe .......... G03B 21/00 359/837 |
| 8,472,119 | B1 | 6/2013 | Kelly |
| 8,479,119 | B2 | 7/2013 | Hörentrup et al. |
| 9,213,178 | B1 | 12/2015 | Giri et al. |
| 9,638,920 | B2 | 5/2017 | Bohn |
| 9,798,061 | B2 | 10/2017 | Hsiao et al. |
| 10,437,031 | B2 * | 10/2019 | Danziger .......... G02B 17/00 |
| 10,444,481 | B2 | 10/2019 | Takahashi |
| 2002/0080487 | A1 | 6/2002 | Yajima |
| 2002/0097762 | A1 | 7/2002 | Yoshimura et al. |
| 2002/0097962 | A1 | 7/2002 | Yoshimura |
| 2003/0081906 | A1 | 5/2003 | Filhaber et al. |
| 2004/0085649 | A1 * | 5/2004 | Repetto .......... G02B 27/0081 359/633 |
| 2005/0012842 | A1 | 1/2005 | Miyagawa et al. |
| 2005/0281515 | A1 | 12/2005 | Togami |
| 2007/0008624 | A1 | 1/2007 | Hirayama |
| 2007/0035707 | A1 | 2/2007 | Margulis |
| 2007/0070859 | A1 | 3/2007 | Hirayama |
| 2007/0165192 | A1 | 7/2007 | Prior |
| 2008/0009458 | A1 | 4/2008 | Hirayama |
| 2008/0192239 | A1 | 8/2008 | Otosaka |
| 2008/0259429 | A1 | 10/2008 | Kamm et al. |
| 2009/0122414 | A1 | 5/2009 | Amitai |
| 2009/0168134 | A1 | 7/2009 | Nojima |
| 2009/0180194 | A1 | 7/2009 | Amaguchi |
| 2010/0027289 | A1 | 2/2010 | Aiki et al. |
| 2010/0201128 | A1 | 8/2010 | Saccomammo |
| 2010/0202048 | A1 | 8/2010 | Amitai |
| 2011/0002019 | A1 | 1/2011 | Routley et al. |
| 2011/0050547 | A1 | 3/2011 | Mukawa |
| 2011/0304828 | A1 | 12/2011 | Khechana |
| 2012/0062850 | A1 | 3/2012 | Travis |
| 2012/0176682 | A1 | 7/2012 | DeJong |
| 2012/0200938 | A1 | 8/2012 | Totani et al. |
| 2013/0022220 | A1 | 1/2013 | Dong et al. |
| 2013/0022316 | A1 | 1/2013 | Pelletier et al. |
| 2013/0250430 | A1 | 9/2013 | Robbuns et al. |
| 2014/0232619 | A1 | 8/2014 | Hiraide |
| 2015/0070864 | A1 | 3/2015 | Rainer et al. |
| 2015/0185483 | A1 | 7/2015 | Hiraide |
| 2015/0331546 | A1 | 11/2015 | Craven-Bartle et al. |
| 2015/0355481 | A1 | 12/2015 | Hilkes |
| 2016/0062119 | A1 | 3/2016 | Fitch et al. |
| 2016/0266388 | A1 | 9/2016 | Dobschal et al. |
| 2016/0031456 | A1 | 10/2016 | Jones et al. |
| 2016/0313567 | A1 | 10/2016 | Kurashige |
| 2016/0363679 | A1 | 12/2016 | Jurok |
| 2016/0370589 | A1 | 12/2016 | Wang |
| 2017/0003504 | A1 | 1/2017 | Vallius |
| 2017/0014680 | A1 | 5/2017 | Pletenetskyy |
| 2017/0122725 | A1 | 5/2017 | Yeoh |
| 2017/0146802 | A1 | 5/2017 | Pletenetskyy |
| 2017/0169747 | A1 | 6/2017 | Richards et al. |
| 2017/0205277 | A1 | 7/2017 | Ohtsuki |
| 2017/0255012 | A1 | 9/2017 | Tam |
| 2017/0276947 | A1 | 9/2017 | Yokoyama |
| 2017/0307896 | A1 | 10/2017 | Kovaluk et al. |
| 2017/0353714 | A1 | 12/2017 | Poulad et al. |
| 2017/0363885 | A1 | 12/2017 | Blum et al. |
| 2018/0130391 | A1 | 5/2018 | Bohn |
| 2018/0267295 | A1 | 9/2018 | Dalrymple et al. |
| 2018/0267309 | A1 | 9/2018 | Klug |
| 2018/0284443 | A1 | 10/2018 | Matsuki |
| 2019/0068944 | A1 | 2/2019 | Zhang et al. |
| 2019/0137818 | A1 | 5/2019 | Saito |
| 2019/0159354 | A1 | 5/2019 | Zheng et al. |
| 2019/0187482 | A1 | 6/2019 | Lanman |
| 2021/0149204 | A1 | 5/2021 | Amitai |
| 2022/0146839 | A1 | 5/2022 | Miller |

FOREIGN PATENT DOCUMENTS

| | | |
|---|---|---|
| JP | H02182447 | 7/1990 |
| JP | H04159503 | 6/1992 |
| JP | 09-258062 | 10/1997 |
| JP | H09304036 | 11/1997 |
| JP | 2001021448 | 1/2001 |
| JP | 2001343608 | 12/2001 |
| JP | 2003065739 | 3/2003 |
| JP | 2008035146 | 2/2008 |
| JP | 2006058404 | 3/2008 |
| JP | 2008053517 | 3/2008 |
| JP | 2012058404 | 3/2012 |
| JP | 2012198263 | 10/2012 |
| JP | 2013231652 | 11/2013 |
| JP | 2016033867 | 3/2016 |
| WO | 2007037089 | 4/2007 |
| WO | WO/2022/107140 | 5/2022 |

OTHER PUBLICATIONS

Erhui Qi;"The Application of Pentaprism Scanning Technology on the Manufacturing of M3MP" ,in Proc. of SPIE vol. 9682 96821A-6. Available at: https://authors.library.caltech.edu/72670/1/96821A.pdf.

* cited by examiner

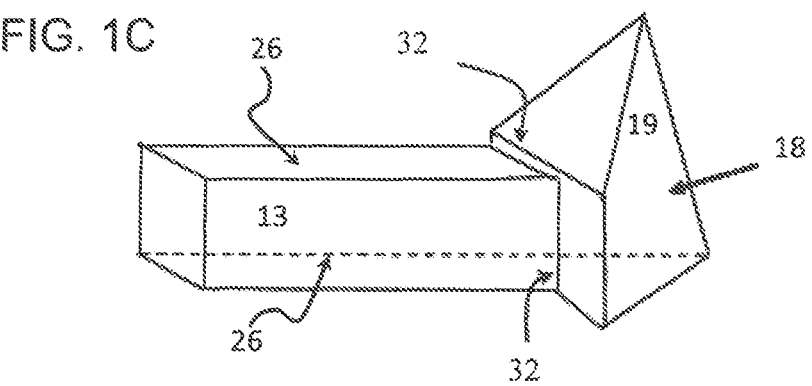

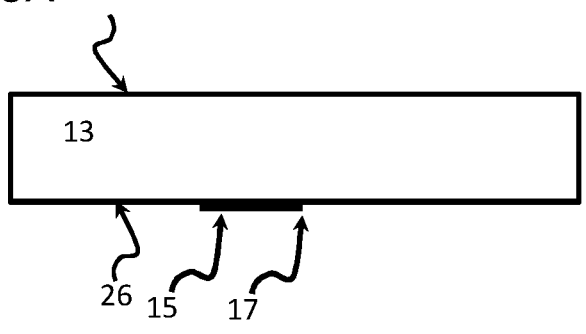
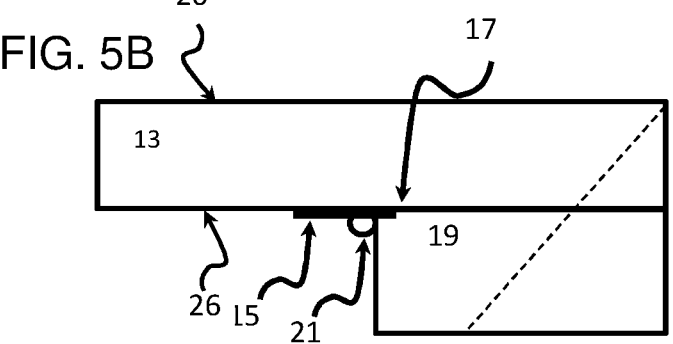
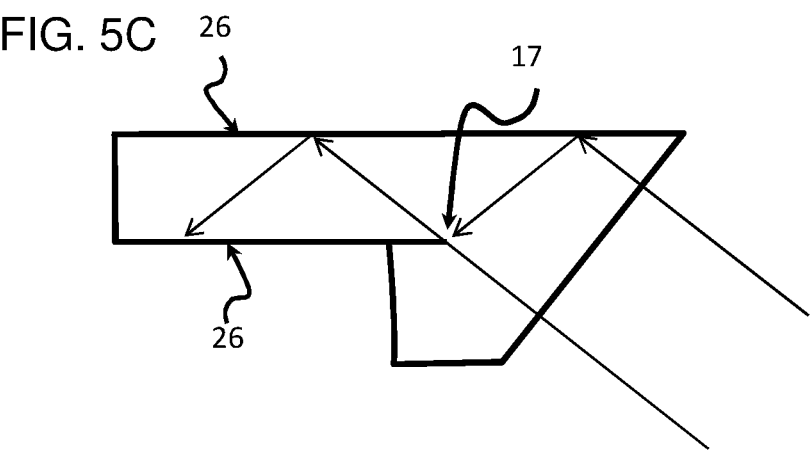

LIGHT-GUIDE DEVICE WITH OPTICAL CUTOFF EDGE AND CORRESPONDING PRODUCTION METHODS

FIELD AND BACKGROUND OF THE INVENTION

The present invention relates to light-guide devices and, in particular, it concerns a light guide device which has a well-defined optical cutoff edge, and corresponding methods for producing such devices.

When manufacturing optical devices, it is often desirable to provide a light guiding device with a complex form in which different regions have surfaces angled with selected non-rectilinear orientations. Examples of such devices relevant to the present invention include, but are not limited to, light guiding elements with coupling-in configurations, and regions of transition between light guiding elements with different transverse dimensions and/or different orientations.

FIGS. 1A and 1B illustrate two examples of devices which include a light guiding element together with a coupling-in prism corresponding to FIGS. 3 and 7, respectively, of PCT Publication No. WO 2015/162611. Referring to the original reference numerals of those drawings in parentheses, each of these devices has a light guiding element (20) with first and second parallel faces (26), and a coupling prism (44, 54) for attachment to the light guiding element so as to provide a suitably angled input surface so that light can be introduced close to the normal to a surface (46, 58) of the prism and then enter the light guide at an angle desired for internal propagation of the light by internal reflection at surfaces (26).

SUMMARY OF THE INVENTION

The present invention is a light guide device and corresponding production methods.

According to the teachings of an embodiment of the present invention there is provided, an apparatus comprising: (a) a light guiding element having a plurality of faces including first and second parallel faces, the light guiding element being configured for guiding light by internal reflection at the first and second parallel faces, one of the plurality of faces providing a coupling surface; (b) a transparent optical element having an interface surface for attachment to the coupling surface, the transparent optical element being configured such that light propagating within the transparent optical element passes through the interface surface and the coupling surface so as to propagate within the light guiding element; (c) a non-transparent coating applied to at least part of at least one of the plurality of faces of the light guiding element, the coating defining an edge adjacent to, or overlapping, the coupling surface of the light guiding element; and (d) a quantity of transparent adhesive deployed between the coupling surface and the interface surface so as to form an optically transmissive interface, the adhesive extending to, and partially overlapping, the edge.

According to a further feature of an embodiment of the present invention, the coupling surface is provided on one of the first and second parallel faces.

According to a further feature of an embodiment of the present invention, the coating extends between the coupling surface and the interface surface.

According to a further feature of an embodiment of the present invention, the coupling surface is inclined relative to the first and second parallel faces.

According to a further feature of an embodiment of the present invention, the coupling surface and the first parallel face meet at a ground edge, and wherein the edge is non-overlapping with the ground edge.

According to a further feature of an embodiment of the present invention, the adhesive fills a recess formed between the ground edge and the interface surface.

According to a further feature of an embodiment of the present invention, the coupling surface is obliquely inclined relative to the first and second parallel faces.

According to a further feature of an embodiment of the present invention, the coupling surface is perpendicular to the first and second parallel faces.

According to a further feature of an embodiment of the present invention, the interface surface is larger than the coupling surface.

According to a further feature of an embodiment of the present invention, the coating is a metal coating.

According to a further feature of an embodiment of the present invention, the coating is a dielectric coating.

According to a further feature of an embodiment of the present invention, the transparent optical element is a coupling prism configured to provide an input surface oriented for input of light into the light guiding element.

According to a further feature of an embodiment of the present invention, the edge defines an optical cutoff edge for light rays passing from the transparent optical element into the light guiding element.

There is also provided according to the teachings of an embodiment of the present invention, an apparatus comprising: (a) a light guiding element having a plurality of faces including first and second parallel faces, the light guiding element being configured for guiding light by internal reflection at the first and second parallel faces, one of the plurality of faces providing a coupling surface; (b) a coupling prism having an interface surface adhered to the coupling surface and an input surface for input of light into the light guiding element; and (c) a non-transparent coating applied to at least part of the coupling surface of the light guiding element and extending between the light guiding element and the coupling prism, the coating defining an optical cutoff edge for light passing from the coupling prism through the coupling surface into the light guiding element.

According to a further feature of an embodiment of the present invention, the coupling prism is adhered to the coupling surface of the light guiding element without adhesive.

There is also provided according to the teachings of an embodiment of the present invention, an apparatus comprising: (a) a light guiding element having a plurality of faces including first and second parallel faces, the light guiding element being configured for guiding light by internal reflection at the first and second parallel faces, one of the plurality of faces providing a coupling surface; (b) a coupling prism having an interface surface for attachment to the coupling surface and an input surface for input of light into the light guiding element; and (c) a quantity of transparent adhesive deployed between the coupling surface and the interface surface so as to form an optically transmissive interface, a part of the quantity of adhesive forming a partial filling of an angled recess between the light guiding element and the coupling prism, wherein an air gap extends along one of the faces of the light guiding element beneath the partial filling, the air gap terminating at an edge within the adhesive so as to define an optical cutoff edge adjacent to the coupling surface of the light guiding element.

There is also provided according to the teachings of an embodiment of the present invention, a method for producing an optical assembly, the method comprising: (a) providing a light guiding element having a plurality of faces including first and second parallel faces, the light guiding element being configured for guiding light by internal reflection at the first and second parallel faces; (b) applying a coating to at least part of at least one of the plurality of faces of the light guiding element; (c) grinding the light guiding element along a plane intersecting the coating so as to simultaneously form a coupling surface of the light guiding element and an edge of the coating; and (d) bonding to the coupling surface an interface surface of a transparent optical element, the transparent optical element being configured such that light propagating within the transparent optical element passes through the interface surface and the coupling surface so as to propagate within the light guiding element, wherein the bonding is performed by applying a quantity of a transparent adhesive between the coupling surface and the interface surface, the quantity of adhesive being applied such that, when the coupling surface and the interface surface are pressed together, an excess of the transparent adhesive overlaps the edge of the coating.

According to a further feature of an embodiment of the present invention, the coating is a non-transparent coating such that the edge defines an optical cutoff edge.

According to a further feature of an embodiment of the present invention, there is also provided a step of selectively removing the coating so as to leave a cutoff edge defined by an edge of an air-gap formed in the transparent adhesive.

BRIEF DESCRIPTION OF THE DRAWINGS

The invention is herein described, by way of example only, with reference to the accompanying drawings, wherein:

FIG. 1C is a schematic isometric view of a light guide device according to an aspect of the present invention in which context the present invention may also be advantageously applied;

FIGS. 5A-5C are schematic side views illustrating stages during the production of a variant implementation of the device of FIG. 4C;

DESCRIPTION OF THE PREFERRED EMBODIMENTS

The present invention is a light guide device and corresponding production methods.

The principles and operation of light guide devices according to the present invention may be better understood with reference to the drawings and the accompanying description.

Figure 2A:
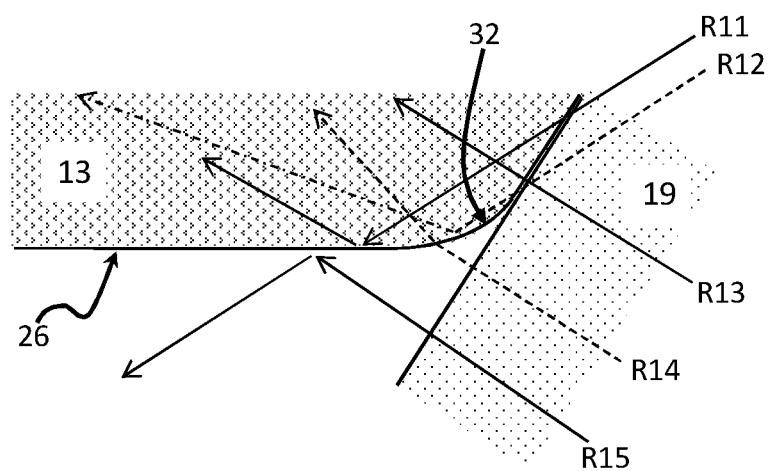
FIGS. 2A, 2B and 2C are schematic enlarged cross-sectional partial views of a region of joining of two transparent optical elements illustrating, respectively, the junction without adhesive, with adhesive, and with a protective layer overlapped by adhesive according to an embodiment of the present invention, each view illustrating various light ray paths for each case.

By way of introduction, the present invention relates to a wide range of situations in which two transparent elements are joined, and especially, although not exclusively, where external surfaces of the two elements meet at an angle or step. Joints between transparent elements of an optical system present a number of challenges for practical implementation. Firstly, edges of blocks of transparent material are not perfectly sharp edges, and are modified (distorted) by some radius of curvature, often with some chipping or other defects. The extent of this rounding typically varies depending on the properties of the materials and the type of equipment used. FIG. 2A illustrates a schematic partial cross-sectional enlarged view of a region of joining of two transparent optical elements 13 and 19, where an edge 32 of one of the elements 13 after grinding exhibits a radius of curvature. This radius of curvature results in various scattering effects which reduce the overall quality of the optical device. Thus, while rays R11 and R13 pass from optical element 19 to optical element 13 without scattering and propagate as intended along optical element 13, and ray R15 is excluded from optical element 13, rays R12 and R14 interact with various intermediate angles of the surface due to the rounding of edge 32, resulting in scattering of rays at angles other than those corresponding to the device design, with a consequent reduction in signal-to-noise for the overall device.

Figure 2B:
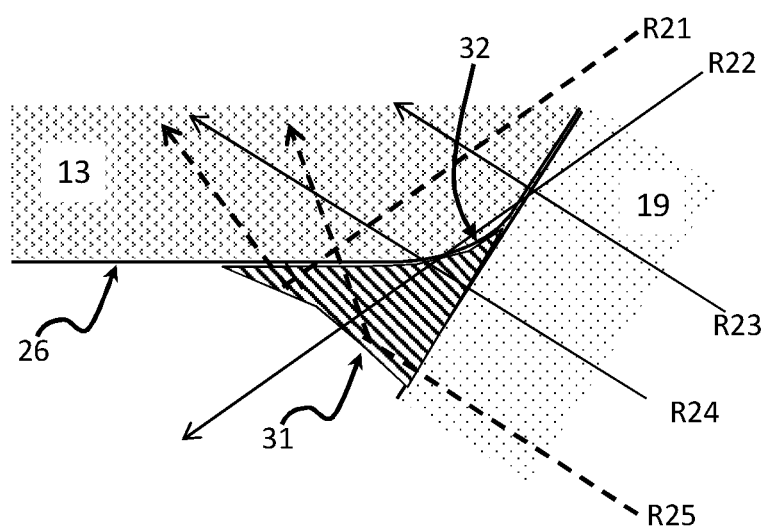

A further problem arises through the use of optical adhesives, as illustrated here in FIG. 2B. In order to ensure uniform optical properties at the interface, a sufficient quantity of optical adhesive is interposed between the facing surfaces that, after pressing them together, the entire area of the facing surfaces to be joined is covered with adhesive. This typically leads to some outflow of excess adhesive at the extremities of the surfaces to be joined, forming an overspill region 31 which may be of arbitrary size and uncontrolled shape. Since the adhesive is transparent adhesive, and typically also index-matched to the transparent optical elements, overspill region 31 defines additional paths of optical rays which may result in scattering and unwanted angles of ray propagation within optical element 13. Thus, in the example illustrated here, rays R23 and R24 pass from optical element 19 to optical element 13 without scattering and propagate as intended along optical element 13, and ray R22 escapes without reaching optical element 13. However rays R21 and R25 interact with various arbitrarily-angled surfaces of overspill region 31 of the adhesive, resulting in scattering of rays at angles other than those corresponding to the device design, with a consequent reduction in signal-to-noise for the overall device.

Figure 2C:
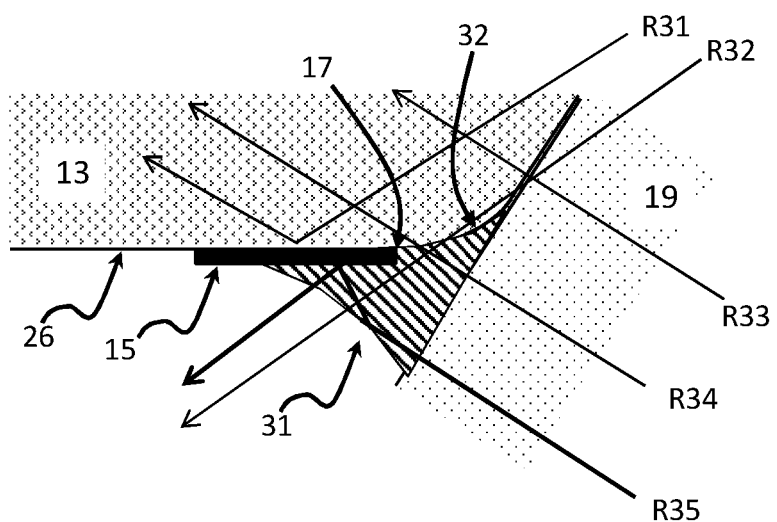

According to one aspect of the present invention, as illustrated in FIG. 2C, there is provided an optical device or apparatus which includes two transparent optical elements, typically a light guiding element 13 with a plurality of faces including first and second parallel faces 26 so that light can be guided within element 13 by internal reflection at first and second parallel faces 26. The second transparent optical element 19 has an interface surface for attachment to a coupling surface of light guiding element 13. A non-transparent (opaque) coating 15 is applied to at least part of at least one of the faces of light guiding element 13, in this case, one of the parallel faces 26. Coating 15 is preferably chosen to provide (or maintain) reflective properties for internal reflection at the surface of the light guiding element, and preferably defines an edge 17 adjacent to, or in some cases described below overlapping, the coupling surface of light guiding element 13. A quantity of transparent adhesive is deployed between the coupling surface and the interface surface so as to form an optically transmissive interface, the adhesive forming an overspill region 31 which extends to, and partially overlaps, the edge 17.

As seen in FIG. 2C, the presence of coating 15 according to this exemplary implementation significantly enhances the optical properties of the device. Firstly, due to the presence of coating 15 on the surface of light guiding element 13, the adhesive of overspill region 31 does not compromise the internal reflection properties of the light guiding element 13, such that ray R31 is internally reflected within the light guiding element and propagates correctly within the light guiding element. Additionally, edge 17 here serves as an optical cutoff edge, cleanly delineating between rays R31, R33 and R34 which enter the light guiding element undistorted, and rays R32 and R35 which are excluded therefrom. Any stray light that is reflected by irregular surfaces of the adhesive overspill region 31, such as ray R35, hits the outer surface of coating 15 and is excluded from the light guiding element.

Coating 15 may be formed from any material suitable for application to a surface of an optical element and which provides the required light-blocking properties and provides internally reflective properties of the transparent optical elements. Examples include, but are not limited to, various metal coatings and various dielectric coatings. In one particularly preferred but non-limiting example, a coating of silver protected by a thin sealing layer to prevent oxidation has been found to be particularly effective and suitable for this application.

Figure 1A:
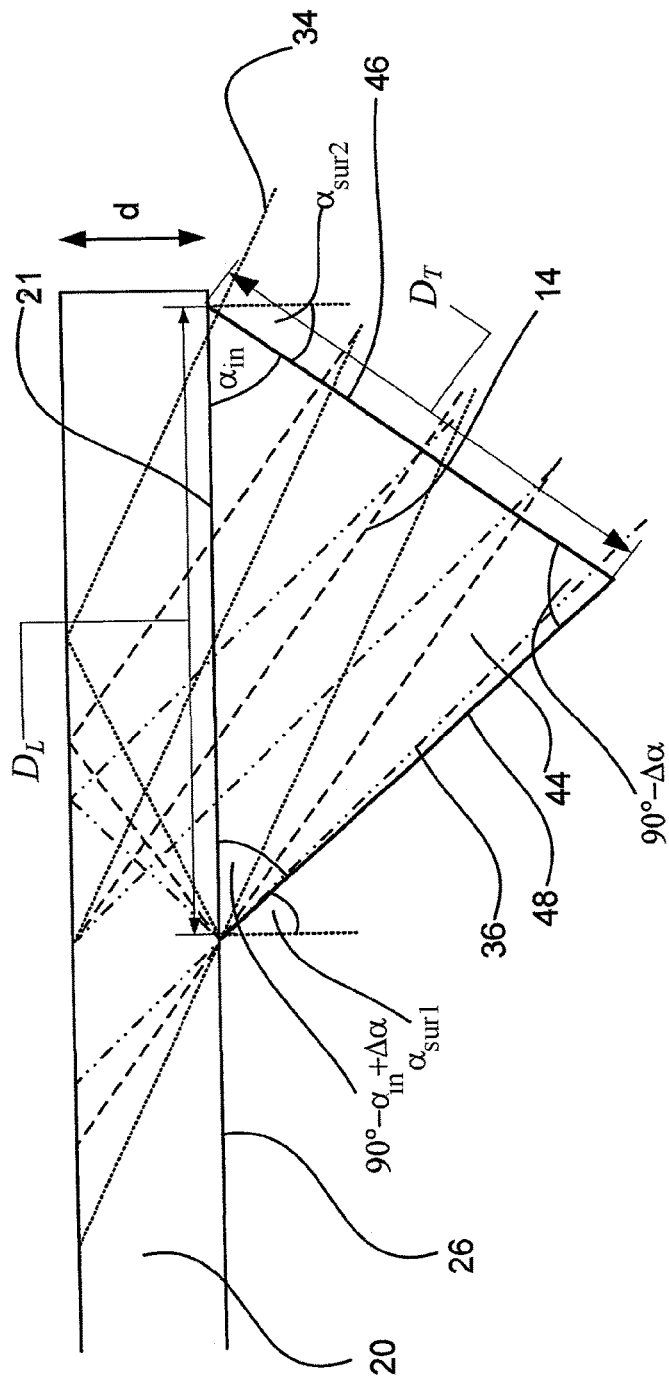
FIGS. 1A and 1B, described above, correspond to FIGS. 3 and 7, respectively, of PCT Publication No. WO 2015/162611, illustrating light guide devices to which the present invention may advantageously be applied.
Figure 1B:
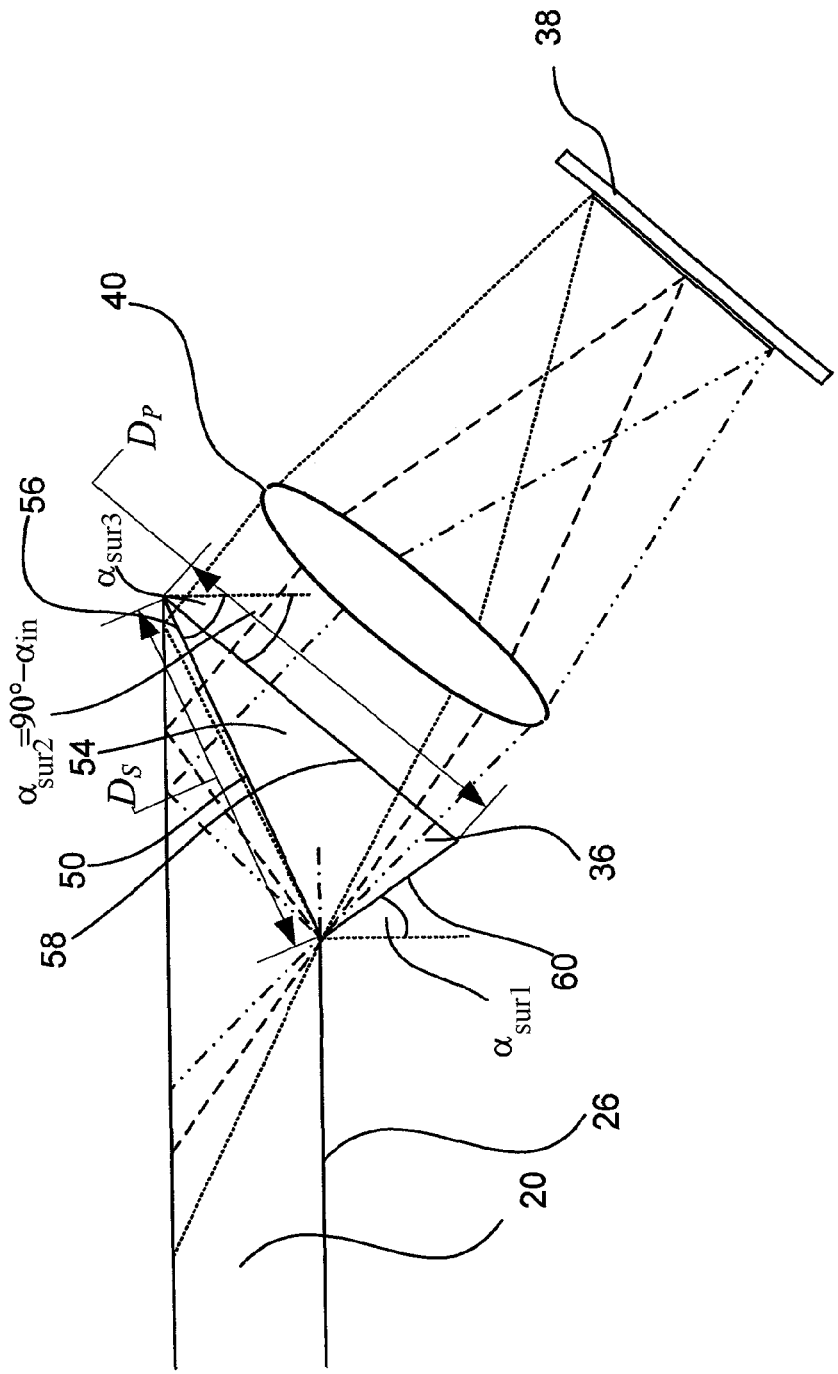

The present invention is applicable to a wide range of applications in which two transparent optical elements are joined together. A subset of applications of particular importance relates to devices in which light is introduced into a light guiding element 13, either from another light guiding element or from a coupling-in configuration 19. Such applications can employ a number of different geometries of attachment, which employ attachment of optical element 19 to various different surfaces of the light guiding element 13, as illustrated in FIGS. 1A-1C. In FIG. 1A, a coupling-in prism is attached to one of the major parallel surfaces of the light guiding element, while in FIG. 1B, attachment of a prism occurs at an obliquely angled coupling-in surface. Attachment may also occur at an end surface perpendicular to the major surfaces of a light guiding element, such as is illustrated in the novel configuration of FIG. 1C, which relates to a rectangular light guiding element with two pairs of parallel surfaces. Further examples of an implementation of the present invention for each of these geometries may be found below.

Figure 3A:
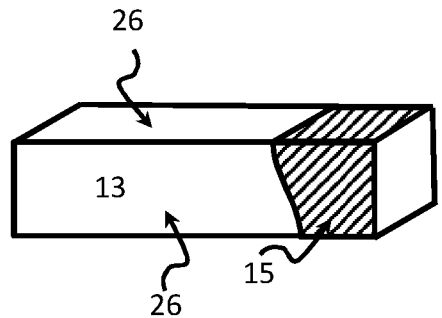
FIGS. 3A-3C are a sequence of schematic isometric views illustrating stages during the production of a light guide device according to an embodiment of the present invention, the views illustrating a light guiding element after application of a coating, after grinding of a coupling surface, and after bonding of a coupling-in prism, respectively.
Figure 3B:
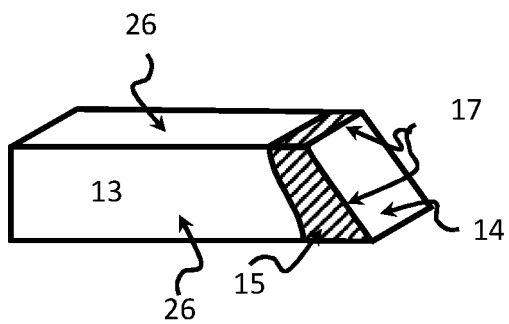
Figure 3C:
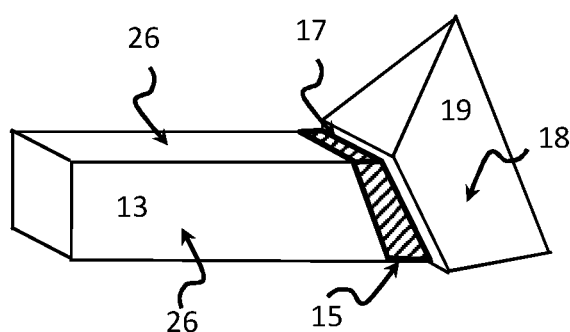

The sequence of operations to produce optical devices according to the present invention may vary considerably according to the particular design employed. FIGS. 3A-3C illustrate a sequence of stages of production, corresponding to a method of one particularly preferred, but non-limiting, aspect of the present invention. In this case, production of an optical assembly includes a step of applying a coating 15 to at least part of at least one face of a light guiding element 13, which may be a slab-type guiding element with two major parallel faces, or may be a rectangular (including square) light guiding element with two pairs of parallel faces for guiding light through four-fold internal reflection, as shown in FIG. 3A. According to the particularly preferred sequence shown here, light guiding element 13 is then ground along a plane intersecting the coating so as to form simultaneously an end coupling surface 14 and an edge 17 of coating 15, as shown in FIG. 3B. An interface surface of a transparent optical element, such as a coupling-in prism 19, is then bonded to coupling surface 14, so that light propagating within the transparent optical element can pass through the interface surface and the coupling surface so as to propagate within the light guiding element. Bonding of prism 19 to light guiding element 13 is performed by applying a quantity of a transparent adhesive between the coupling surface and the interface surface. The adhesive is applied such that, when the coupling surface and the interface surface are pressed together, an excess of the transparent adhesive overlaps edge 17 of coating 15, thereby generating a final configuration which is analogous to that described above with reference to FIG. 2C, where the coating prevents the adhesive from adversely affecting the light guiding element properties, and where edge 17 provides a well-defined optical cutoff edge delineating what beams do and do not enter the light guiding element. This approach may be used to advantage for coupling surfaces at any desired angle, including orthogonal coupling surfaces such as that of FIG. 1C and oblique coupling surfaces such as that of FIGS. 3B and 3C.

The simultaneous forming of coupling surface 14 and edge 17 in a grinding/polishing process is considered advantageous in that it ensures correct positioning of edge 17 relative to coupling surface 14, typically just beyond any non-planar edge effects occurring at the extremity of the coupling surface, such as shown in FIG. 2C, and avoids the need for formation of a sharp edge during the coating process. As a result of this process, coupling surface 14 and one of the parallel faces of the light guiding element meet at a ground edge, and edge 17 of the coating is in non-overlapping relation with the ground edge. A "ground edge" in this context refers to the entire region over which an angular transition occurs which deviates from flat surface.

Figure 3D:
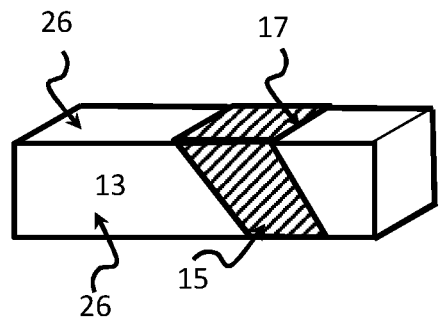
FIG. 3D is a schematic isometric view of a light guiding element after application of a coating with a pre-formed edge according to an alternative production sequence of certain embodiments of the present invention.

Alternatively, as illustrated in FIG. 3D, a region of coating 15 may be applied to a light guiding element 13 in such a manner as to define an edge 17 during the application of the coating. Techniques for applying the coatings of the present invention in general, and in particular, for selective application of a layer so as to form a well-defined edge, are known in the art, and can be chosen according to the type of coating used, and the corresponding application technique employed. For example, a protected silver coating or a dielectric coating can be applied by conventional deposition techniques, such as sputter coating or wet chemical deposition, and the shape of the coating can be defined by various conventional techniques including, but not limited to, lithographic techniques defining a pattern of photoresist, and mechanical masking such as by application of adhesive tape. Application of the coating with a well-defined edge defined during the application process is particularly useful in applications in which another transparent optical element is to be bonded to the light guiding element on one of the major parallel surfaces, such as in the configuration of FIG. 1A. An example of such an application will be described below with reference to FIGS. 4A-4C.

The coatings of the present invention may be applied on one or more surface of one or both of the optical elements to be bonded, and may be applied to either the entirety of the surface(s) or, more preferably, to only a part of the surface(s) which is sufficiently close to the bonding region to be needed for its adhesive-protection properties. Thus, in many implementations, the total area of the coating in the final assembled device is less than half the total surface area of the corresponding surface, and in certain cases, is less than the total area of the bonded surfaces.

In certain applications, coating on only one side, or a subset of the faces, may be sufficient. For example, where two components are to be coupled so that certain surfaces will be flush after coupling, it may be possible to remove excess adhesive effectively after bonding by performing a further polishing step which is effective to resurface the two components in a common plane.

Figure 4A:
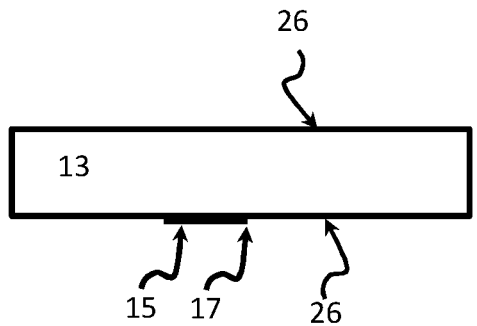
FIGS. 4A and 4B are schematic side views illustrating stages during the production of a further embodiment of the present invention illustrating a light guiding element after application of a coating, and after bonding of a coupling-in prism, respectively.
Figure 4B:
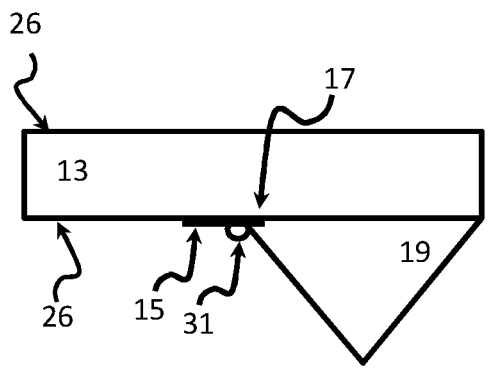
Figure 4C:
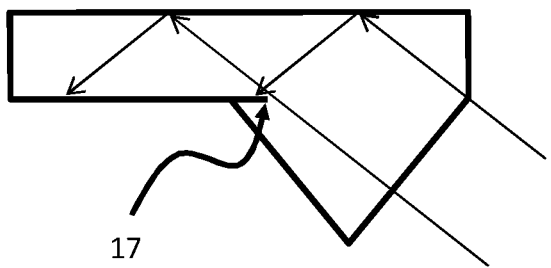
FIG. 4C is a view similar to FIG. 4B illustrating the overall optical effect of a device resulting from the production process of FIGS. 4A and 4B.

Turning now to FIGS. 4A-4C, these illustrate an implementation of the present invention in which the coupling surface is provided on one of the major parallel faces defining the light guide. In this case, coating 15 is advantageously applied so as to define edge 17, most preferably in a location which is to be overlapped by the transparent optical element 19 after attachment (FIG. 4B). After attachment of the transparent optical element 19, the coating is seen to extend between the coupling surface and the interface surface. As a result, any overspill region 31 of adhesive, as well as the ground edge of coupling prism 19, fall outside the optical cutoff edge 17 such that the adhesive overspill and any imperfections of the coupling prism edge do not adversely affect the optical properties of the device.

FIG. 4C schematically depicts the overall optical properties of the assembled components. As in a number of other particularly preferred implementations illustrated here, transparent optical element 19 is a coupling prism configured to provide an input surface 18 oriented for input of light into light guiding element 13. Specifically, for a light guiding element which is implemented as part of a system in which light propagates within the element within a given range of angles, input surface 18 may advantageously be oriented roughly perpendicular to the input ray directions, thereby minimizing distortions. Additionally, employing edge 17 as an optical cutoff, this configurations can be utilized for "filling" the light guiding element with rays of an image, where a slightly oversized image aperture is "trimmed" by an optical cutoff edge to ensure that the image (and its reflected conjugates) are present at all locations within the light guiding element. For this purpose, edge 17 does not necessarily have to be a straight edge, but should be a cleanly defined edge of whatever shape is desired. Various arrangements for filling of a light guiding element with an image are described in PCT Patent Publication No. WO 2015/162611 for light guiding elements with one pair of parallel faces, and in co-pending PCT Patent Application No. PCT/IL2017/051028 (which was unpublished on the filing date of this application) for light guiding elements with two pairs of parallel faces. In each of those configurations, the optical cutoff edge serving to trim the in-coupled images can advantageously be implemented according to the teachings of the present invention. It will be noted that the trimming edge thickness is defined by the thickness of the coating layer, which is thin, and will generate minimal scattering.

FIGS. 5A-5C illustrate a modified production sequence and final form of an optical assembly functionally similar to that of FIGS. 4A-4C, but in which the optical geometry is enhanced. In this case, light guiding element 13 is coated with coating 15, as in FIG. 4A. In the next step (FIG. 5B), a rectangular prism 19 is glued on one of the primary parallel faces of light guide element 13, partly covering the coating 15. The use of a rectangular prism during assembly facilitates effective pressing together of the prism to the light guiding element, thereby achieve better bonding. The bonded prism and light guiding element are then polished along the dashed line to generate an enhanced device geometry, as depicted in FIG. 5C.

Parenthetically, although described primarily in relation to devices in which optical elements are bonded by use of optical adhesive, it should be noted that certain examples of the present invention can be implemented without adhesive, where alternative bonding techniques are used. The structures of FIGS. 4A-4C and 5A-5C are examples of structures suitable for such an implementation, where the coupling surface of light guiding element 13 and the interface surface of transparent optical element 19 are carefully prepared to a high degree of planarity and then joined by glueless contact bonding ("direct bonding") by bringing the surfaces into direct contact. In such cases, there is no problem of adhesive overspill. However, the technique of providing a coating with an optical cutoff edge extending between the components ensures a high quality optical cutoff, independent of any imperfections in the edge of the coupling prism.

Figure 6A:
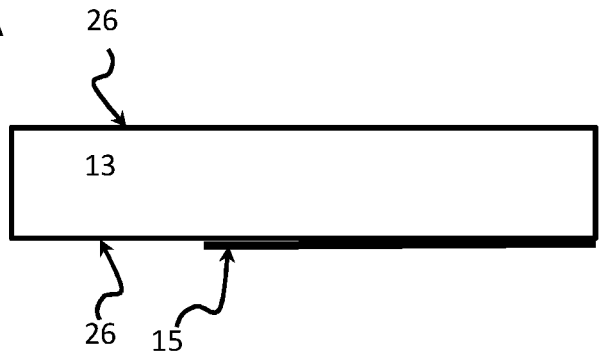
FIGS. 6A-6C are a sequence of schematic isometric views illustrating stages during the production of a light guide device according to a further embodiment of the present invention, the views illustrating a light guiding element after application of a coating, after grinding of a coupling surface, and after bonding of a coupling-in prism, respectively.
Figure 6B:
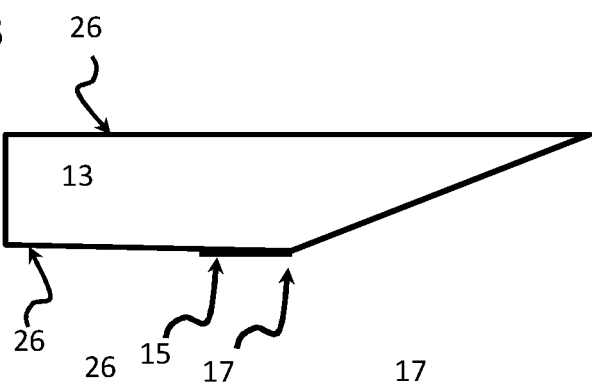
Figure 6C:
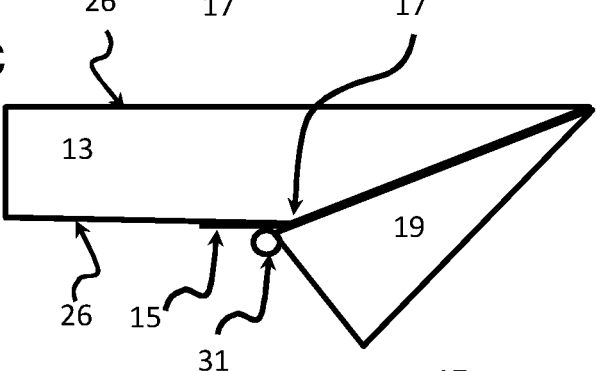
Figure 6D:
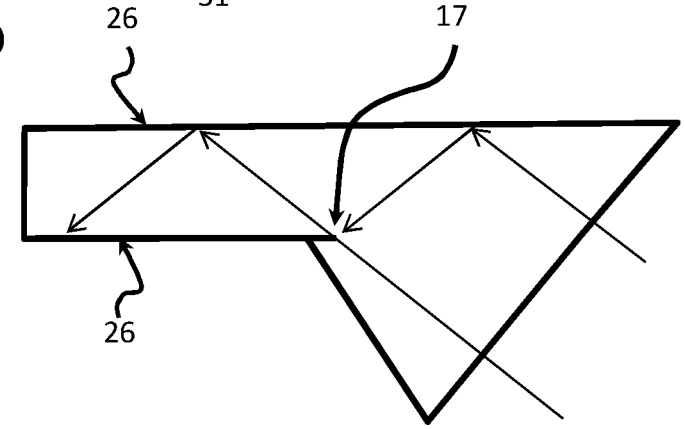
FIG. 6D is a view similar to FIG. 6C illustrating the overall optical effect of a device resulting from the production process of FIGS. 6A-6C.

Turning now to FIGS. 6A-6D, these illustrate an exemplary non-limiting process for implementing the present invention in the context of a geometry similar to that of FIG. 1B. In this example, light guiding element 13 is first coated with coating 15 as shown in 6A. The end of the light guiding element is then polished to form the coupling surface, and simultaneously shortens the coated region so as to generate trimming edge 17, as shown in FIG. 6B. In FIG. 6C, prism 19 is bonded to the coupling surface of the light guiding element 13, with any adhesive overspill 31 overlying edge 17 and part of coating 15. In this case, optionally, the interface surface of prism 19 may advantageously be larger than the coupling surface of the light guiding element. FIG. 6D depicts schematically the overall optical structure of the combined assembly, in which edge 17 provides an optical cutoff, and the optical properties are insensitive to imperfections of the angled edges of the elements.

Figure 7A:
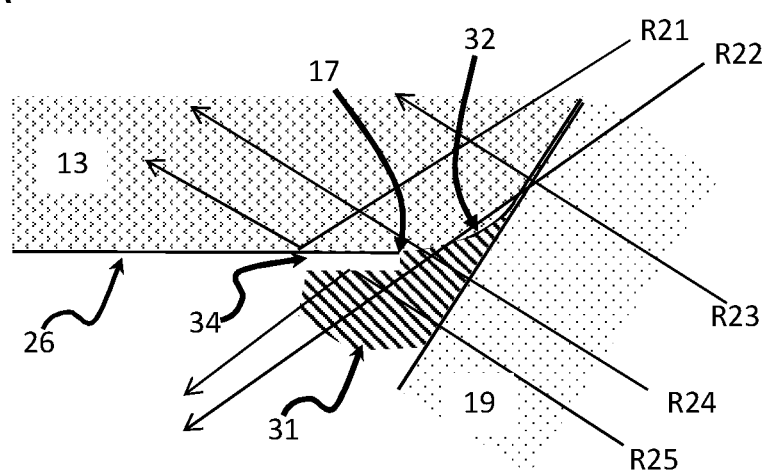
FIG. 7A is a view similar to FIG. 2C illustrating a further variation of the present invention according to which a coating layer is removed to leave an air gap.
Figure 7B:
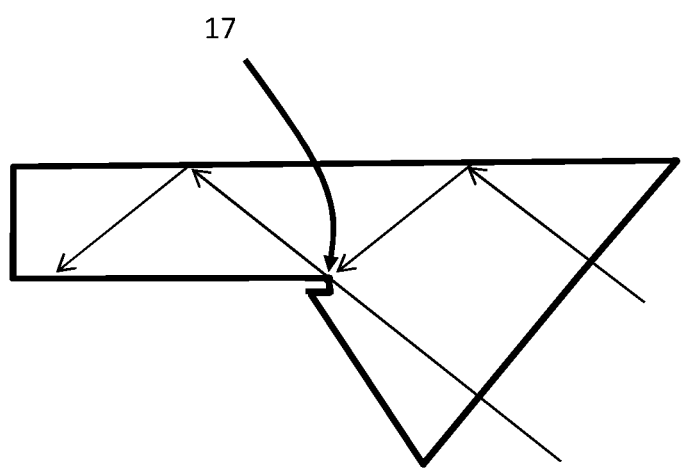
FIG. 7B is a view similar to FIG. 6D illustrating an implementation of that device using an air gap according to FIG. 7A.

Turning now to FIGS. 7A and 7B, there is shown a further variant implementation of the present invention. In this case, instead of employing an opaque coating to define a cutoff edge, a removable coating 15 is used to protect the light guiding element surfaces during application of adhesive, and to define cutoff edge 17. After the bonding is complete and the adhesive has solidified, the coating is selectively removed so as to leave a cutoff edge defined by an edge of an air-gap 34 formed in the transparent adhesive.

In this case, the coating/layer does not need to have any particular optical requirements, and is only present during application of adhesive to attach the coupling-in prism 19. The air-gap 34 is generated after the material of the layer (such as photoresist or wax) has been removed. The optical properties of this configuration including the behavior of the various rays is analogous to the rays illustrated in FIG. 2C, except that reflectance of ray R21 is now by total internal reflection (TIR) of the light guiding element (instead of layer reflectivity) and the reflectance of R25 is by TIR within the adhesive (instead of from an outer surface of the coating). Trimming edge 17 is now determined by the edge of the air-gap, after which the optical path is continuous. The overall optical properties of the device are depicted schematically in FIG. 7B.

The present invention may be implemented in the contexts of optical elements that are bonded at surfaces of any orientation, including at coupling surfaces that are perpendicular to an extensional direction of a light guiding element, such as was illustrated above in FIG. 1C. As mentioned, the invention is also applicable to light guiding elements with two pairs of parallel surface within which rays propagate by four-fold reflection, referred to as a "2D waveguide."

Figure 8A:
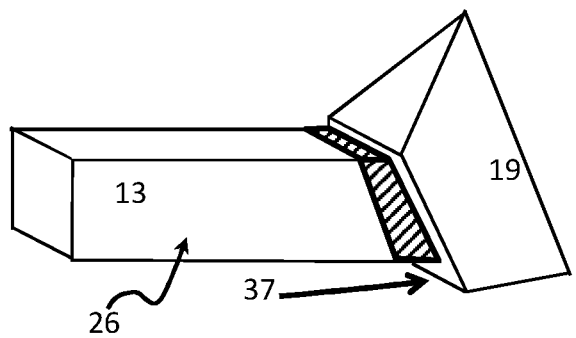
FIG. 8A is an isometric view of a light guide device that is a further variant of the devices of FIGS. 1C and 3C, constructed and operative according to the teachings of an embodiment of the present invention.
Figure 8B:
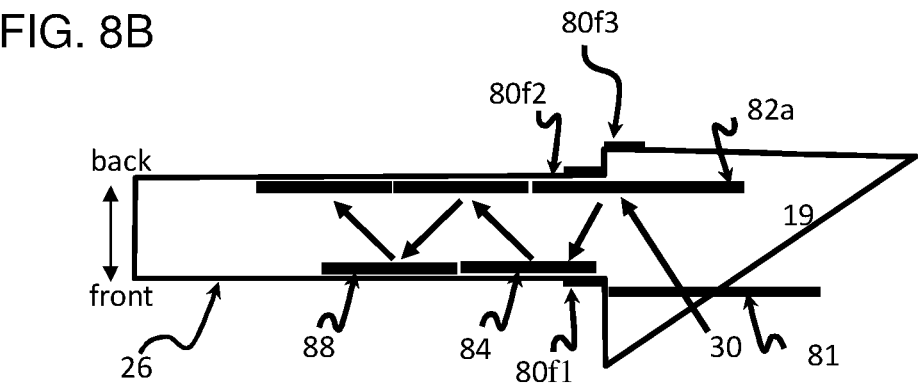
FIG. 8B is a schematic horizontal cross-sectional view taken through the device of FIG. 8A adjacent to the base of the light guiding element, illustrating propagation of an input image aperture along the light guiding element.

In certain cases, protective layer coatings may be used to advantage on selected surfaces of two elements being bonded. Thus, in FIGS. 8A and 8B, it may be preferably to apply a protective coating on both sides of light guiding element 13 in order to reduce non uniformity that can be caused by a discontinuity between prism 19 and light guiding element 13 (region 37 in FIG. 8A). The coating is shown on both sides of light guiding element 13 as 80/1 and 80/2. By introducing a protective coating layer all around the end of light guiding element 13 (including 80/1, 80/2 and the other two orthogonal sides) the guidance of the waveguide will be protected from glue spillover or edge non-uniformities from all sides. If the step between prism 19 and light guiding element 13 near 80/2 is small (or doesn't exist) then it is beneficial to also protect the reflectance of the prism 19 from any glue spillover by protecting coating 80/3 as well.

Figure 9:
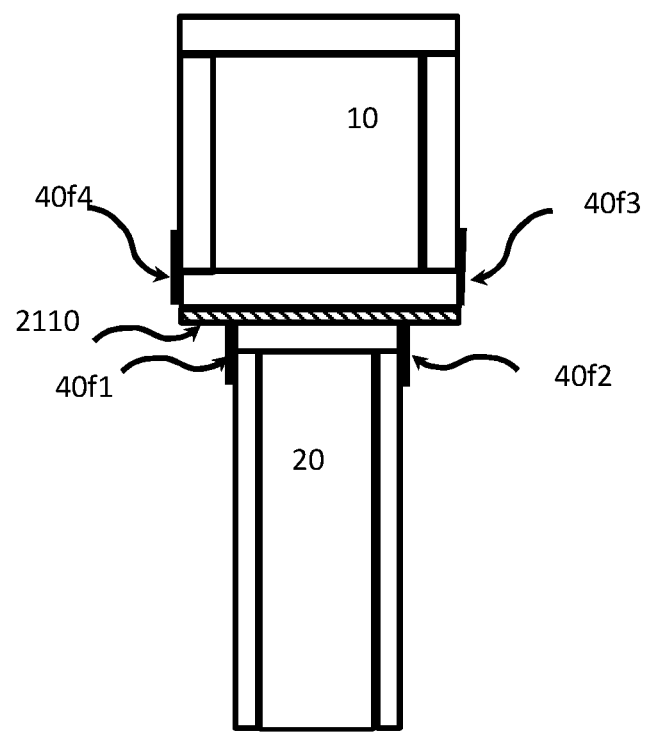
FIG. 9 is a schematic end view of a light guide device formed from superposition of two light guiding elements, implemented according to the teachings of an aspect of the present invention.

Turning finally to FIG. 9, although illustrated herein primarily in the context of a coupling-in prism attached to a light guiding element, the present invention can equally be applied to other applications such as, for example, where a first light guiding element (or "waveguide") feeds into another. FIG. 9 illustrates one such example in which a rectangular (2D) light guiding element 10 feeds into a slab-type (1D) light guiding element 20. This configuration corresponds to one of a number of such options described in the aforementioned co-pending PCT Patent Application No. PCT/IL2017/051028 (which was unpublished on the filing date of this application), and the invention can equally be applied to the various variant implementations, with or without a coupling prism, described therein.

Waveguide 10 is slightly larger than waveguide 20 in order to enable complete illumination (filling) of waveguide 20. The glue 2110 can spillover either or both of waveguides 20 and 10. Particularly preferred implementations of the present invention thus provide protective coating layers on both waveguides, as illustrated at 40/1, 40/2, 40/3 and 40/4.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

The invention claimed is:

1. An apparatus comprising:
   (a) a light guiding element having a plurality of faces including first and second parallel faces, said light guiding element being configured for guiding rays of an image by internal reflection at said first and second parallel faces, one of said plurality of faces providing a coupling surface;
   (b) a transparent optical element having an interface surface for attachment to said coupling surface, said transparent optical element being configured such that rays of an image propagating within said transparent optical element pass through said interface surface and said coupling surface so as to propagate within the light guiding element;
   (c) a non-transparent coating applied to at least part of at least one of said plurality of faces of said light guiding element, said coating defining an edge adjacent to, or overlapping, said coupling surface of said light guiding element, wherein said coating defines an optical cutoff edge for rays of an image passing from said transparent optical element into said light guiding element, and in that said non-transparent coating is configured to generate internal reflection at an underlying region of said at least one face.

2. The apparatus of claim 1, further comprising a quantity of transparent adhesive deployed between said coupling surface and said interface surface so as to form an optically transmissive interface, said adhesive extending to, or overlapping, said optical cutoff edge.

3. The apparatus of claim 1, wherein said coupling surface is provided on one of said first and second parallel faces.

4. The apparatus of claim 3, wherein said coating extends between said coupling surface and said interface surface.

5. The apparatus of claim 2, wherein said coupling surface is inclined relative to said first and second parallel faces.

6. The apparatus of claim 5, wherein said coupling surface and said first parallel face meet at a ground edge, and wherein said edge is non-overlapping with said ground edge.

7. The apparatus of claim 6, wherein said adhesive fills a recess formed between said ground edge and said interface surface.

8. The apparatus of claim 5, wherein said coupling surface is obliquely inclined relative to said first and second parallel faces.

9. The apparatus of claim 5, wherein said coupling surface is perpendicular to said first and second parallel faces.

10. The apparatus of claim 1, wherein said interface surface is larger than said coupling surface.

11. The apparatus of claim 1, wherein said coating is a metal coating.

12. The apparatus of claim 1, wherein said coating is a dielectric coating.

13. The apparatus of claim 1, wherein said transparent optical element is a coupling prism configured to provide an input surface oriented for input of rays of an image into said light guiding element.

14. The apparatus of claim 13, wherein said coupling prism is adhered to said coupling surface of said light guiding element without adhesive.

15. An apparatus comprising:
(a) a light guiding element having a plurality of faces including first and second parallel faces, said light guiding element being configured for guiding rays of an image by internal reflection at said first and second parallel faces, one of said plurality of faces providing a coupling surface;
(b) a coupling prism having an interface surface for attachment to said coupling surface and an input surface for input of rays of an image into the light guiding element; and
(c) a quantity of transparent adhesive deployed between said coupling surface and said interface surface so as to form an optically transmissive interface, a part of said quantity of adhesive forming a partial filling of an angled recess between said light guiding element and said coupling prism, wherein an air gap extends along one of said faces of said light guiding element beneath said partial filling, said air gap terminating at an edge within said adhesive so as to define an optical cutoff edge adjacent to said coupling surface of said light guiding element.

16. A method for producing an optical assembly, the method comprising:
(a) providing a light guiding element having a plurality of faces including first and second parallel faces, said light guiding element being configured for guiding rays of an image by internal reflection at said first and second parallel faces, one of said plurality of faces providing a coupling surface;
(b) applying a non-transparent coating to at least part of at least one of said plurality of faces of said light guiding element, said non-transparent coating defining an edge adjacent to, or overlapping, said coupling surface of said light guiding element; and
(c) bonding to said coupling surface an interface surface of a transparent optical element, the transparent optical element being configured such that rays of an image propagating within the transparent optical element passes through the interface surface and the coupling surface so as to propagate within the light guiding element, wherein said bonding is performed by applying a quantity of a transparent adhesive between said coupling surface and said interface surface, said quantity of adhesive being applied such that, when said coupling surface and said interface surface are pressed together, said transparent adhesive extends to or overlaps said edge of said coating, wherein said edge defines an optical cutoff edge for rays of an image passing from said transparent optical element into said light guiding element, and wherein said non-transparent coating is configured to generate internal reflection at an underlying region of said at least one parallel face such that the excess of said transparent adhesive does not compromise the internal reflection properties of the light guiding element.

17. The method of claim 16, wherein said coupling surface is provided on one of said parallel surfaces.

\* \* \* \* \*